United States Patent Office 2,759,504
Patented Aug. 21, 1956

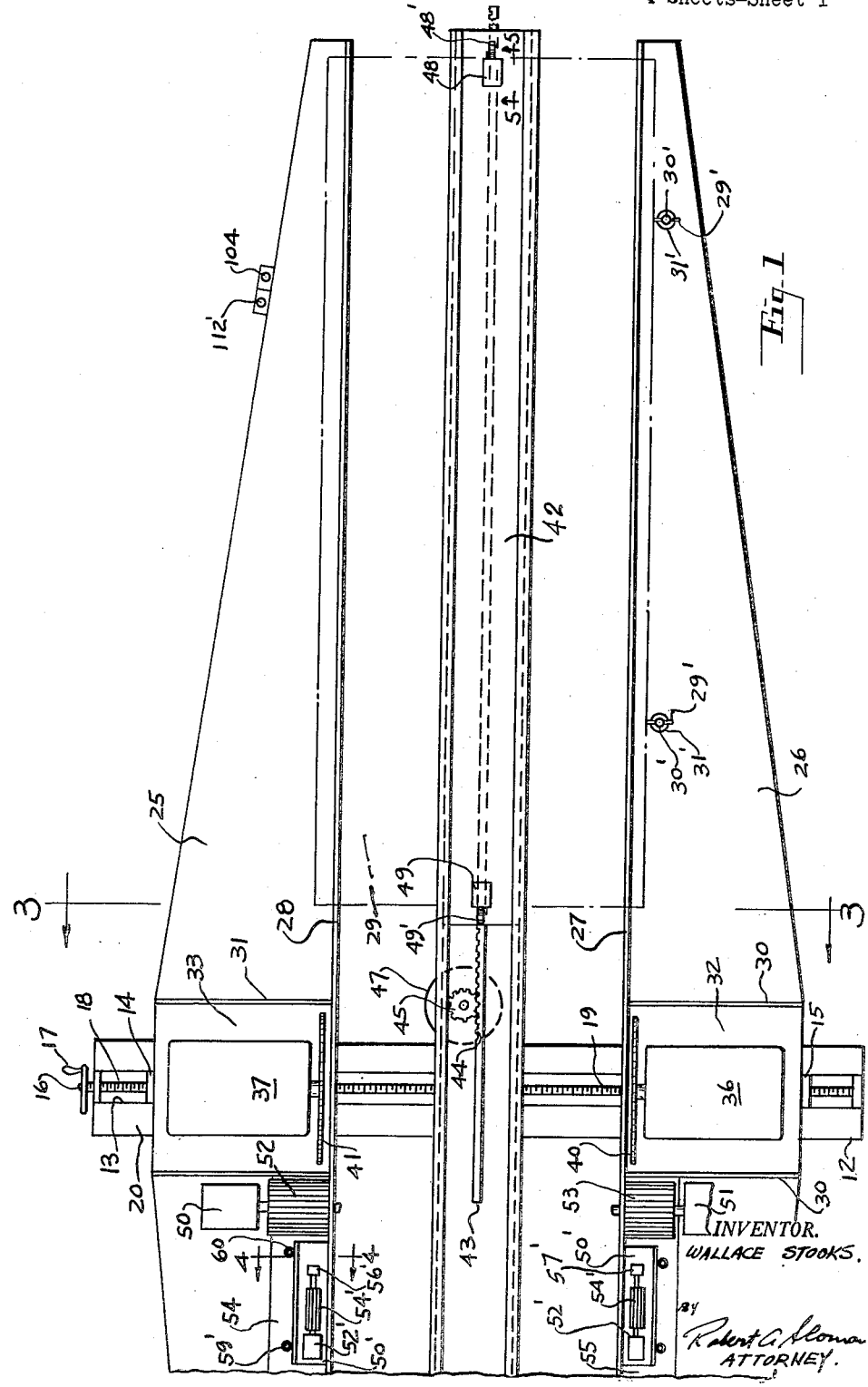

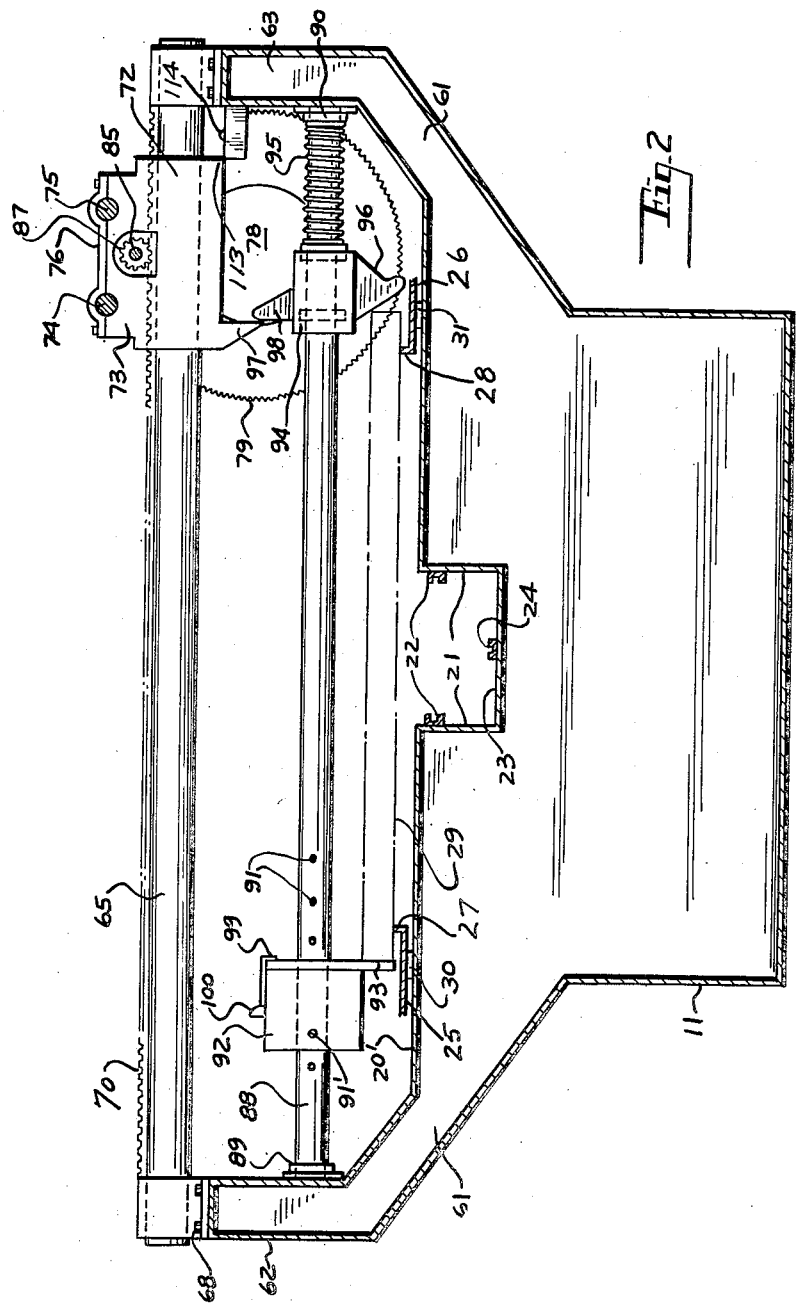

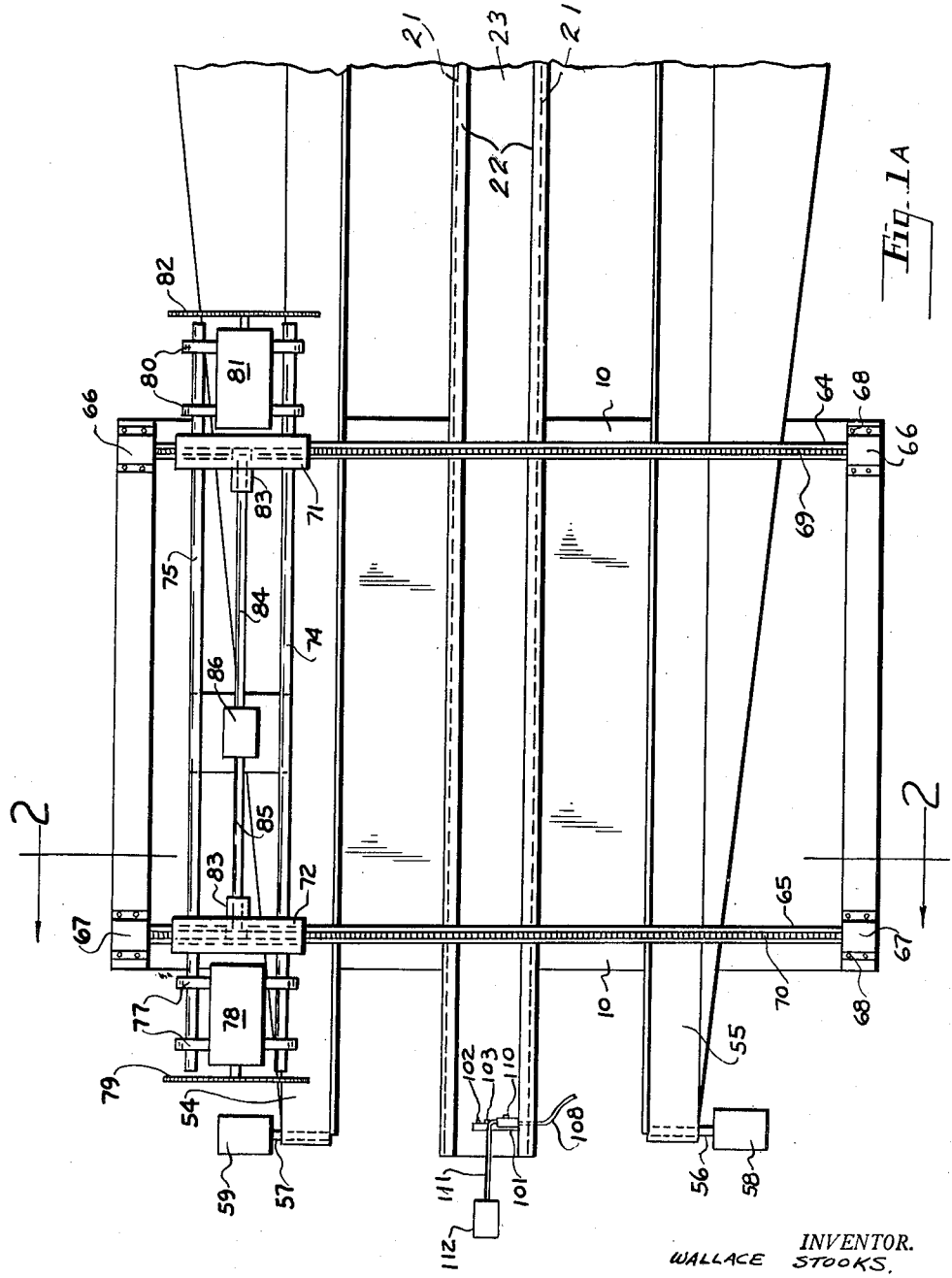

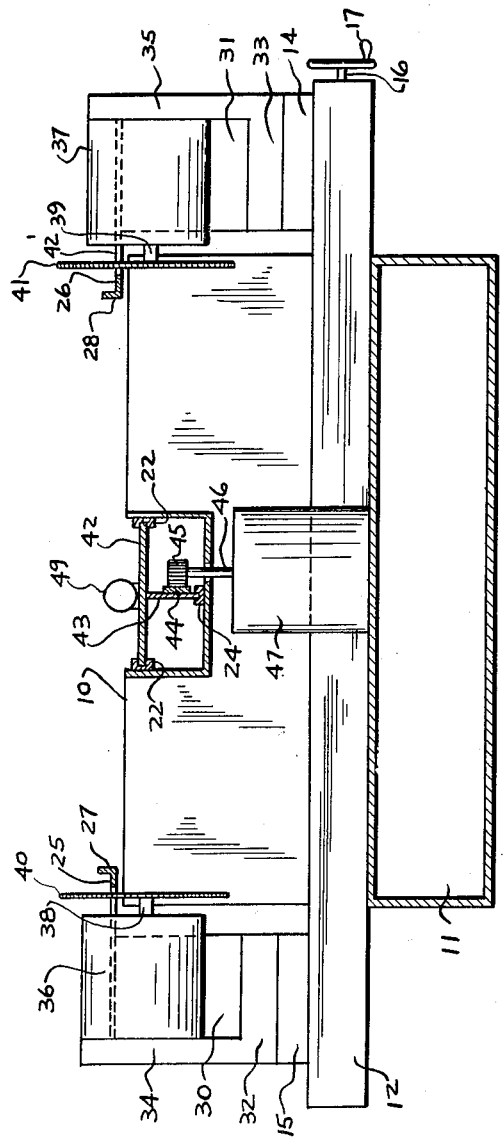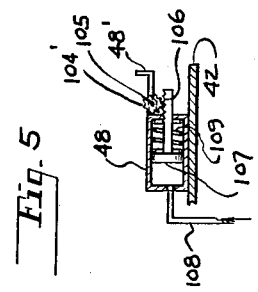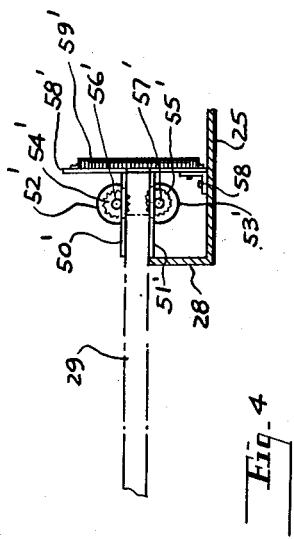

2,759,504

EDGE TRIMMING MACHINE

Wallace Stooks, Livonia, Mich.

Application February 25, 1954, Serial No. 412,472

9 Claims. (Cl. 144—3)

This invention relates to a tenoner construction, and more particularly to a device for sawing the longitudinal sides and ends of a rectangular piece of material, as for example, a door.

It is the object of the present invention to provide a plurality of opposed rotary saws upon a machine bed together with power operated mechanism for supporting and longitudinally sliding a rectangular workpiece, whereby the longitudinal edges thereof are trimmed to the desired dimension.

It is the further object of the present invention to provide in such machine, additional opposed power in saws upon a travelling carriage adapted for power movement transversely of the length of said workpiece for trimming the opposite ends of such workpiece to a pre-determined dimension.

It is the further object of the present invention to provide a novel workpiece supporting device in conjunction with longitudinal saw supports, whereby the workpiece supports and the saw supports may be simultaneously adjusted inwardly and outwardly for setting the saw blades to the desired workpiece width.

It is the further object of the present invention to provide a novel power operated workpiece conveying device for transporting the door longitudinally of the longitudinal edge cutting saws, whereby the workpiece is cut throughout its length.

It is the further object of the present invention to provide power operated mechanism for breaking up and disposing of the longitudinal strips cut from the trimmed longitudinal edges of the workpiece.

It is the further object of the present invention to provide additional power operated abrading tools adapted to operatively register with the longitudinal corners of the workpiece for finishing the same as the workpiece is fed longitudinally thereof.

It is the still further object of the present invention to provide a novel tenoner device which will trim all four edges of a rectangular workpiece in a simple manner and employing automatically mechanism to greatly reduce costs of finishing such workpiece.

These and other objects will be seen from the following specification and claims, in conjunction with the appended drawings, in which:

Fig. 1 is a fragmentary plan view of the present tenoner device illustrating the right end and central portion thereof.

Fig. 1a is a fragmentary plan view illustrating the remainder of the tenoner device, being the left end extension of the illustration of Fig. 1.

Fig. 2 is a section taken on line 2—2 of Fig. 1a.

Fig. 3 is a section taken on line 3—3 of Fig. 1.

Fig. 4 is a fragmentary section taken on line 4—4 of Fig. 1; and

Fig. 5 is a fragmentary section taken on line 5—5 of Fig. 1.

It will be understood that the above drawings illustrate merely a preferred embodiment of the invention, and that other embodiments are contemplated within the scope of the claims hereafter set forth.

The present tenoner construction consists of an elongated bed 10 and a bottom bed portion 11, as indicated in Fig. 3.

Intermediate the ends of the beds 10–11, there is provided a transverse slide support 12, which has a grooved dovetail and elongated guideway 13 Fig. 1 adapted to receive the transversely slidable supports 14 and 15, which are cooperatively received by support 12 and which extend above as in Fig. 3.

Transverse shaft 16 with handwheel 17 secured thereto at one end is journaled and supported upon the cross member 12, and has the oppositely threaded portions 18 and 19 for effecting simultaneous inward and outward adjustments of the workpiece supports upon rotation of handwheel 17, in the manner hereafter described.

The top surfaces 20 across support 12 provide a sliding mounting for the supports 14 and 15 of plates 32 and 33. Standards 34 and 35 on plates 32 and 33 respectively, support the motors 36 and 37, whose out-put shafts 38 and 39 carry the longitudinal edge trimming saws 40 and 41, which extend upwardly through the slotted portions 42′ in the elongated workpiece supporting and mounting plates 25 and 26 respectively.

The upper portion of the bed element 10 includes the top wall 20′, which has an elongated central channelled portion defined by the upright spaced and elongated plates 21 Fig. 2, which carry the opposed inwardly directed channel supports 22. The elongated channel is completed by the elongated bottom plate 23, which has mounted longitudinally and centrally thereof, upwardly projecting channel element 24.

The elongated and formed plates or supports 25 and 26 with upright work supporting rails 27 and 28 respectively, are supported upon opposite sides of the bed 10 by means of the parallel spaced upright brackets 30 and 31, which extend upwardly from the motor mounting plates 32 and 33.

By this construction, it is apparent that the rails 27 and 28 partially overlie bed 10 as in Fig. 3, and furthermore inward and outward adjustment of the blocks 14 and 15 will effect corresponding inward or outward movements of the rails 27 and 28, together with corresponding saw operating motors 36 and 37. In other words, there is always a fixed relation between the respective saws 40 and 41 and the rails 27 and 28.

The elongated rectangularly shaped workpiece 29, which may be a panel door, or other door construction, or which may be any rectangular piece sought to be trimmed on all four sides, is supported adjacent its longitudinal edges upon the rails 27 and 28, and is adapted for longitudinal movement thereon.

Rectangular work-conveyor plate 42 is positioned within bed 10 with its opposite longitudinal edges slidably mounted within the opposed channels 22. Upright elongated plate 43 depends from plate 42 and its lower longitudinal edge is slidably mounted within elongated channel 24, as in Figs. 2 and 3.

Elongated rack gear 44 is longitudinally disposed upon and secured to the side wall of plate 43 and is in mesh at all times with pinion 45 rotatably driven by upright shaft 46, which shaft is driven by the electric motor 47 mounted upon bed 11.

Upon the top surface of plate 42 and secured thereto in longitudinally spaced relation, are a pair of workpiece grips 48 and 49 adapted to receive and retain therebetween workpiece 29, which may be a door. By this construction, upon energizing motor 47, conveyor plate 42 and the workpiece 29 secured thereto, will slide longitudinally of the machine bed 10 along the upright rails 27 and 28 with respect to the rotary saw blades 40 and 41, to thereby longitudinally trim the edges of the workpiece.

It will be noted from Fig. 1, that the workpiece securing elements 48 and 49 have suitable hold-down extensions 48' and 49' for immovably securing the workpiece with respect to conveyor 42.

Mounted upon one of the platform elements 26, are a pair of upright cylindrical guide supports 31' which carry upright posts 30', which in turn adjustably receive the transverse inwardly directed pins 29', adapted to operatively engage one longitudinal edge of the workpiece for guiding the same during its longitudinal movement.

As viewed in Fig. 1, there are shown a pair of motors 50 and 51 upon whose inwardly directed horizontally disposed and opposed drive shafts, are the abrading cutters 52 and 53. These operatively engage the strips of material severed by the saws 40 and 41 as the workpiece is fed longitudinally thereof.

The cutters 52 and 53 break up the strips into short lengths or particles which drop upon the upper portions of the conveyor belts 54 and 55 respectively. The conveyor belts are suitably supported upon portions of the machine bed with the outer ends of said belts supported upon and driven by the respective shafts 56 and 57 of motors 58 and 59, whereby the cut particles may be dropped into a suitable container at the left end of the machine, as viewed in Fig. 1a.

The present device also includes edge trimming cutters adapted to operatively engage each of the upper and lower longitudinal edges of the workpiece upon its opposite sides, as shown in Figs. 1 and 4.

As the workpiece 29 passes the cutters 52 and 53, its opposite longitudinal edges are engaged by the elongated trimming cutters, such as cutters 54' and 55' secured upon the output shafts of electric motors 52' and 53' respectively. Said motors are mounted upon the vertically spaced workpiece edge receiving plates 50' and 51', and the outer ends of the cutters 54' and 55' are supported and journaled as at 56' and 57'. The plates 50' and 51' are mounted upon the flexible supporting plate 58' anchored at its lower end as by the bracket 58 upon the platform 25.

Upright spaced coiled springs 59' and 60 are anchored at their lower ends adjacent bracket 58, Fig 4, and the upper ends of said springs are anchored at the top of plate 58'. The purpose of the springs 59' and 60 is to tend to flex the plate 58' outwardly slightly, thereby lifting motor supporting plate 50' slightly for maintaining the cutter 54' lightly against the longitudinal upper edge of workpiece 29.

While only the edge trimmers 54' and 55' have been described in connection with Fig. 4, as shown in Fig. 1, there are provided a second pair of edge trimmers of the same construction and method of operation as the trimming cutters 54' and 55'. The sole purpose of the trimmers is to put a finished corner edge on each of the longitudinal side edges of the workpiece.

As viewed in Figs. 1a and 2, the bed 11, towards its left end has a pair of elongate outwardly and upwardly arranged extensions 61 terminating in the elongated upright supports 62 and 63.

Longitudinally spaced transverse shafts 64 and 65 span the supports 62 and 63 with the ends of said shafts retained within the collars 66 and 67 on said supports bolted thereto as at 68. Each of the shafts 64 and 65 has mounted on its upper surface an elongated rack gear 69 and 70.

The shafts 64 and 65 provide the mounting for the transversely movable workpiece and trimming saws 79 and 82, Fig. 1a, hereafter described.

Slidably mounted upon shafts 64 and 65, are a pair of upright spaced tubular elements 71 and 72, each of which has an upright plate 73 Fig. 2 transversely grooved to receive portions of the parallel spaced elongated and longitudinally extending motor mounting rods 74 and 75, which are held down by the plates 76.

Tubular mountings 77 Fig. 1a project from opposite sides of motor 78 for slidably and adjustably mounting said motor upon the shafts 74 and 75, said motor carrying a circular saw blade 79. Tubular supports or collars 80 project from opposite sides of electric motor 81 for slidably supporting and adjustably mounting electric motor 81, which carries workpiece end trimming saw 82.

Each of the upright tubular members 71 and 72 has a pair of opposed oppositely directed collars 83, which receive and support the ends of the output shafts 84 and 85, extending from opposite sides of electric motor 86. The outer ends of shafts 84 and 85 extend into collars 83 and have secured on their ends the pinions 87, which are respectively in mesh with the corresponding rack gears 69 and 70 on shafts 64 and 65. Consequently, with motor 86 energized, the tubular members 71 and 72, as well as the motors 78 and 81 and their saw blades 79 and 82 will move transversely across the machine bed with said saws trimming the opposite ends of the workpiece positioned thereunder, in the manner hereafter described.

Interposed between the upright supports 62 and 63 directly below the shafts 64 and 65, are a pair of transverse longitudinally spaced shafts 88, whose opposite ends are supported within the sockets 89 and 90 upon the interior surfaces of the supports 62 and 63. Each of the shafts 88 has a plurality of longitudinally spaced transverse apertures 91 for receiving and locking pin 91', which extends through the workpiece edge engaging stops 92, said stops having depending plates 93 against which operatively register one of the longitudinal edges of the workpiece 29 during the end trimming thereof.

Upon the opposite ends of the shafts 88, are a pair of spring-biased workpiece edge engaging stops 94 with coiled springs 95 mounted on said shafts 88 between the mounting collar 90 and said stops 94, normally urging the same inwardly.

The stops 94 have downwardly depending fingers 96, which operatively engage the opposite longitudinal edge of workpiece 29 for immovably holding the same in position during the cross feeding movements of the end trimming saws 79 and 82.

One of the tubular members 72 has a depending portion 97 adapted to operatively engage the contact of reversing switch 100 mounted upon the stop 92, Fig. 2, whereby through suitable electrical connections, the power in-put to motor 86 is reversed reversing the direction of rotation of the shafts 84 and 85. Thus, the saws 79 and 82 are automatically returned transversely to the position shown in Fig. 1a, till the rear edge 113 engages stop button 114 for motor 86.

Referring to Fig. 1a, adjacent the end of the channel 21—23, there is provided a pair of stop buttons 102 and 103, upon the support 101. At the completion of the forward feed movement of conveyor plate 42, said plate engages both of the buttons 102 and 103. Button 102, for example, operates a switch for stopping and reversing the direction of rotation of shaft 46 on conveyor operating motor 47, so that said conveyor is returned to its initial position to the right end of the bed, as in Fig. 1.

The two workpiece engaging and hold-down clamps 48 and 48' and 49—49' are pneumatically operated in such a manner that when the pneumatic power is released at the end of the longitudinal feeding stroke of carriage 42, the hold-down elements 48' and 49' will swing, outwardly and down upon a suitable pivot and by means of a spring, completely disengaging the workpiece 29, so that the conveyor 42 may return automatically to its initial position, however leaving the door or other workpiece 29 supported upon the rails 27 and 28 at the left end of the bed. In this position, the workpiece is best illustrated in Fig. 2, wherein said workpiece engages the stop plates 93, adjustably secured upon the shafts 88. The opposite longitudinal edge of the workpiece is engaged by the spring-biased stops or fingers 96. This structure immovably retains the workpiece in position during the cross cutting of the opposite ends thereof by the rotary saw blades 79 and 82.

As shown in Fig. 1a, the second button 103 when operatively engaged by the conveyor 42, energizes automatically the cross carriage operating motor 86, so that at the end of the longitudinal feed movement of the workpiece, the cross carriage including the motor mountings for motors 78 and 81 immediately traverse the opposite ends of the workpiece for trimming the same. The reversing switch 99–100 shown in Fig. 2, and as above described, is energized by the finger 97 for effecting a reversal of operation of motor 86 whereby said cross carriage is automatically returned to the initial position shown in Fig. 1a.

It is contemplated that any suitable type of workpiece engaging clamp could be used, such as the spaced clamps 48 and 49 of Fig. 1. In the present construction, as it is desirous that the conveyor immediately will return to its initial position of Fig. 1 after completing its longitudinal traverse, there should be such clamping construction as will automatically be disengaged from the workpiece, leaving the workpiece in the position shown in Fig. 2, but permitting the carriage to return. For this purpose, there is provided in the present application, a pair of clamps 48 and 49, one of which is shown on an enlarged scale in Fig. 5, and includes the pneumatic cylinder 48 secured upon the conveyor plate 42 and containing piston 107 with outwardly projecting piston rod 106, having a rack gear formation in its outer surface. Compressed air is supplied to the left end of cylinder 48 by the conduit 108 connecting control valve 110 in Fig. 1a through which compressed air is supplied by conduit 111 from a source of compressed air 112.

Coiled spring 109 within cylinder 48 will effect an instantaneous return of piston 107 to the left end of cylinder 48 when the source of compressed air is disconnected, as when the end of conveyor plate 42 operatively engages control valve 110 at the end of its feeding stroke. Pinion 104′ is journaled as at 105 and is in mesh with the rack teeth on piston rod 106. Said pinion will rotate in a counterclockwise direction until the grip 48′ operatively engages the top surface of the workpiece 29.

This is one form of construction of the workpiece clamp which may be employed for the above purpose. It is contemplated that the present construction could be utilized with other types of clamps, as shown in Fig. 1.

The control button 104 is adapted to energize the saw operating motors 36, 37, 78 and 81; and to also energize cutter motors 50 and 51 and edge trimming motors 52′ and 53′, of which there are four of such motors, as well as the motors 58 and 59, which drive the conveyor belts 54 and 55.

Upon the application of the starter button 104, all of these motors will be energized for continuous operation until the electrical connection is broken in any suitable fashion.

The motor 86 which controls the cross feeding of the end trimming saws is a stop and start motor, as is also motor 47, which operates conveyor plate 42.

Button 112′, shown in Fig. 1, is adapted to energize motor 47 for starting the same. Swith button 102 shown in Fig. 1a, when engaged by conveyor 42 stops motor 47 and reverses its direction of operation, so that the conveyor is withdrawn and returned to the position shown in Fig. 1. At the same time, as the conveyor reaches the end of its feed movement engaging button 102, it will simultaneously engage button 103, Fig. 1a, for starting cross feed controlling motor 86. The switch 99–100 of Fig. 2, when engaged by finger 97 at the end of the cross feed movement, effects a reversal of rotation of motor 86 for returning the cross cutting saws 79 and 82 to the initial position shown in Fig. 1a, slide 72 engaging button 114, Fig. 2, stops the return movement of slides 71 and 72. Finger 98 on stop 94 is engaged by finger 97 before motor 86 stops disengaging stop 94 from the workpiece 29.

The additional button 110 shown in Fig. 1a, is also engaged by the conveyor at the end of the feed movement, and this button operates the corresponding air control valve 110, cutting off the flow of compressed air to cylinder 48, and at the same time permitting exhaust of compressed air from said cylinder, so that the spring 109 immediately returns piston 107 to the position shown in Fig. 5, and disengages the workpiece clamp arm 48′.

Having described my invention, reference should now be had to the claims which follow for determining the scope thereof.

I claim:

1. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, and a pair of opposed power operated cylindrically shaped strip abraders mounted on and depending from said rails rearwardly of said saw blades and with their axes parallel to the axes of said saw blades adapted to operatively engage the trimmed strips for breaking them into short pieces.

2. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, a pair of opposed power operated cylindrically shaped strip abraders mounted on and depending from said rails rearwardly of said saw blades and with their axes parallel to the axes of said saw blades adapted to operatively engage the trimmed strips for breaking them into short pieces, and longitudinally extending endless conveyors upon said bed below said abraders for transmitting the cut-up pieces from said machine.

3. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, a pair of parallel vertically spaced plates secured to each of said rails outwardly thereof and rearwardly of said saw blades for receiving therebetween the cut longitudinal edges of said workpiece, and elongated power driven rotary edge trimmers mounted on each of said plates with their axes parallel to the longitudinal workpiece edges for operatively engaging the top and bottom corners of said workpiece at its opposite sides.

4. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, a pair of laterally arranged parallel spaced upright supports on said bed extending longitudinally thereof adjacent one end and projecting thereabove, a pair of longitudinally spaced transverse shafts spanning said bed above said rails with their respective ends secured upon said supports, and a pair of longitudinally spaced power driven saws reciprocally mounted on said shafts, with their cutting blades lying in parallel planes at right angles to the planes of said first saw blades for simultaneously trimming the opposite ends of said workpiece.

5. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, longitudinally spaced transverse shafts spanning said bed at one end thereof above said rails, a pair of longitudinally spaced power driven saws reciprocally mounted on said shafts, with their cutting blades lying in parallel planes at right angles to the planes of said first saw blades for trimming the opposite ends of said workpiece, the saw mountings on said shafts including tubular members slidably receiving said shafts, rack gears on said shafts, and power operated pinions within said tubular members in mesh with said rack gears for effecting reciprocal feed movements of said transversely movable saws.

6. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, longitudinally spaced transverse shafts spanning said bed at one end thereof above said rails, a pair of longitudinally spaced power driven saws reciprocally mounted on said shafts, with their cutting blades lying in parallel planes at right angles to the planes of said first saw blades for trimming the opposite ends of said workpiece, the saw mountings on said shafts including tubular members slidably receiving said shafts, rack gears on said shafts, power operated pinions within said tubular members in mesh with said rack gears for effecting reciprocal feed movements of said transversely movable saws, a pair of longitudinally extending parallel spaced shafts spanning said tubular members, and apertured motor supports slidably mounted on said latter shafts for adjustably securing said latter power driven saws thereon.

7. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, longitudinally spaced transverse shafts spanning said bed at one end thereof above said rails, a pair of longitudinally spaced power driven saws reciprocally mounted on said shafts, with their cutting blades lying in parallel planes at right angles to the planes of said first saw blades for trimming the opposite ends of said workpiece, a second pair of longitudinally spaced transverse shafts spanning said bed below said first transverse shafts and above said rails, stops slidably adjusted on said second pair of shafts operatively engaging one longitudinal edge of said workpiece, and second spring-biased stops on said second pair of transverse shafts operative engaging the opposite edges of said workpiece for retaining the same on said rails during cutting of the ends thereof.

8. An edge trimming machine comprising an elongated bed, a transverse slide support thereon, spaced slides on said support adapted for transverse in and out adjustments in unison, elongated parallel spaced workpiece supporting rails, one mounted on each slide, a power operated saw mounted on each slide in fixed relation to said rails and including upright saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, said clamps each including a pneumatic cylinder with spring returned piston therein, a piston rod projecting from said piston and carrying a rack gear, a rotatable pinion in mesh with said rack gear, a gripping arm on said pinion adapted on rotation of said pinion to operatively engage said workpiece, and switch means operable by said conveyor at the end of its feed movement cutting off power to said cylinder, whereby said gripping arm is automatically disengaged from said workpiece.

9. An edge trimming machine comprising an elongated bed, elongated parallel spaced workpiece supporting rails thereon, a power driven saw mounted on said bed on each side of said rails, and including saw blades lying in planes parallel to said rails for cutting the opposed longitudinal edges of a workpiece on said rails, a longitudinally reciprocal conveyor plate slidably mounted upon said bed between said rails, longitudinally spaced clamps on said conveyor adapted to engage over opposite ends of said workpiece for moving the same along said rails, a pair of laterally arranged parallel spaced upright supports on said bed extending longitudinally thereof adjacent one end and projecting thereabove, a pair of longitudinally spaced transverse shafts spanning said bed above said rails with their respective ends secured upon said supports, and a pair of longitudinally spaced power driven saws reciprocally mounted on said shafts, with their cutting blades lying in parallel planes at right angles to the planes of said first saw blades for simultaneously trimming the opposite ends of said workpiece.

References Cited in the file of this patent

UNITED STATES PATENTS

| | Kendall ("Saw-Teeth") | Jan. 16, 1826 |
| 4,017 | Throckmorton | May 1, 1845 |
| 707,184 | Thomas | Aug. 19, 1902 |

(Other references on following page)

| | | | | | |
|---|---|---|---|---|---|
| 726,403 | Calhoun et al. | Apr. 28, 1903 | 2,507,644 | Peters | May 16, 1950 |
| 1,329,634 | Schumacher | Feb. 3, 1920 | 2,651,335 | Stagg | Sept. 8, 1953 |
| 1,461,919 | La Malta | July 17, 1923 | 2,673,581 | Dornath et al. | Mar. 30, 1954 |
| 1,761,096 | Tower | June 3, 1930 | | | |
| 2,207,782 | Carlson | July 16, 1940 | | | |

FOREIGN PATENTS 5,502  Great Britain _____ June 1, 1827